June 16, 1925.  E. D. TILLYER  1,542,112
LENS TESTING INSTRUMENT
Filed April 10, 1922   3 Sheets-Sheet 1
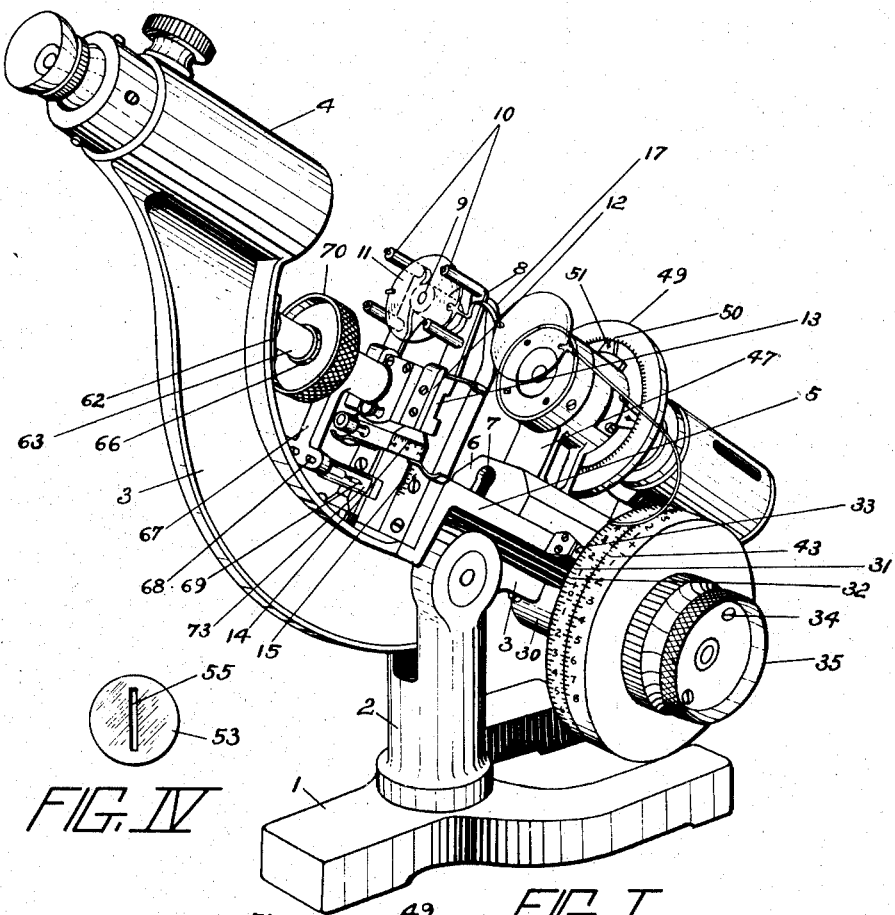
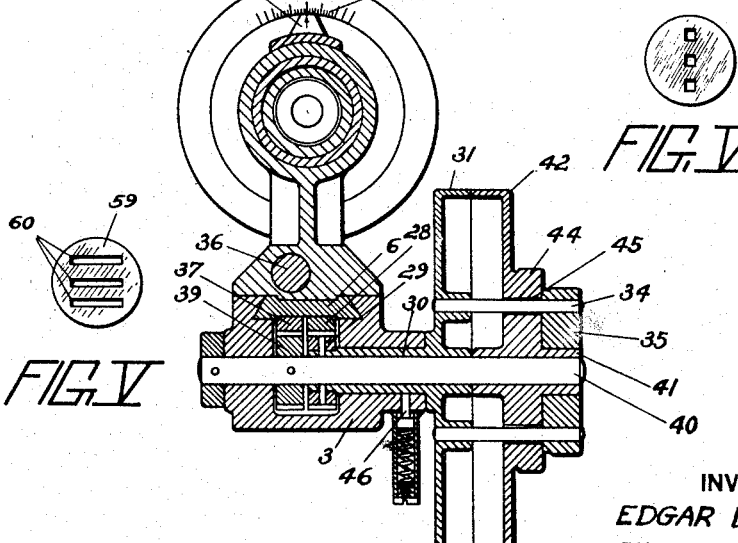
INVENTOR
EDGAR D. TILLYER
BY
ATTORNEYS

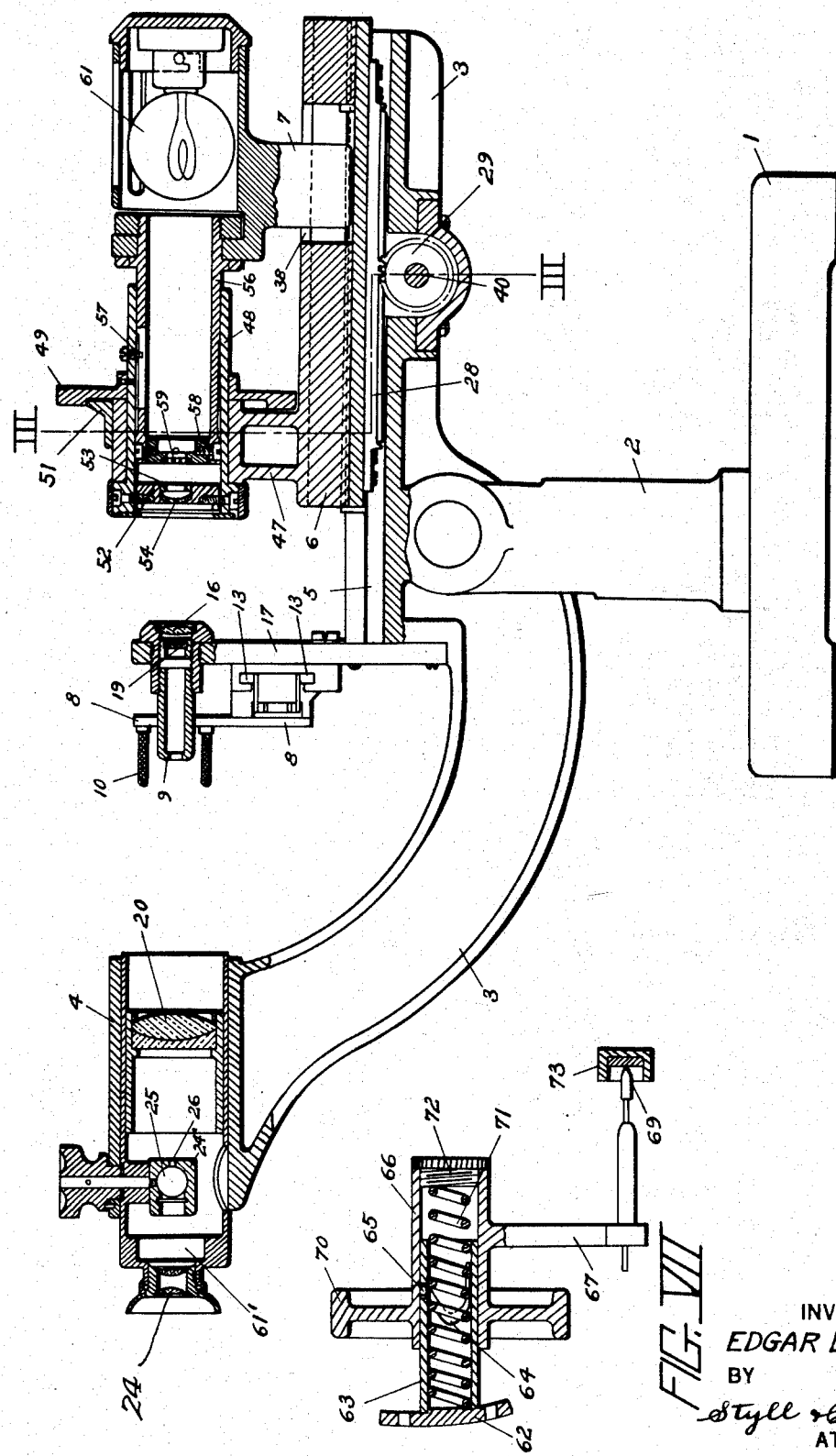

June 16, 1925.  
E. D. TILLYER  
LENS TESTING INSTRUMENT  
Filed April 10, 1922  
1,542,112  
3 Sheets-Sheet 3
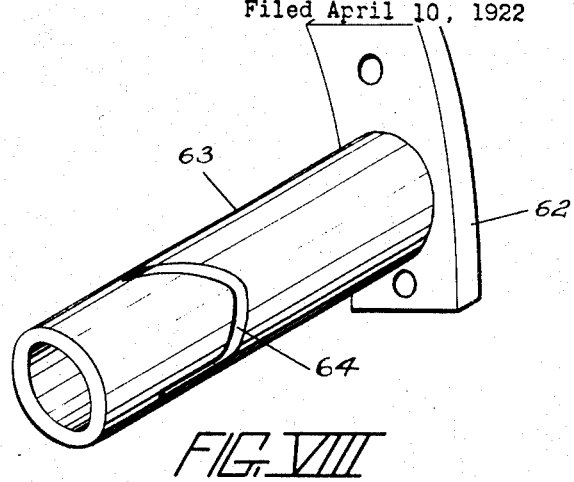
FIG. VIII
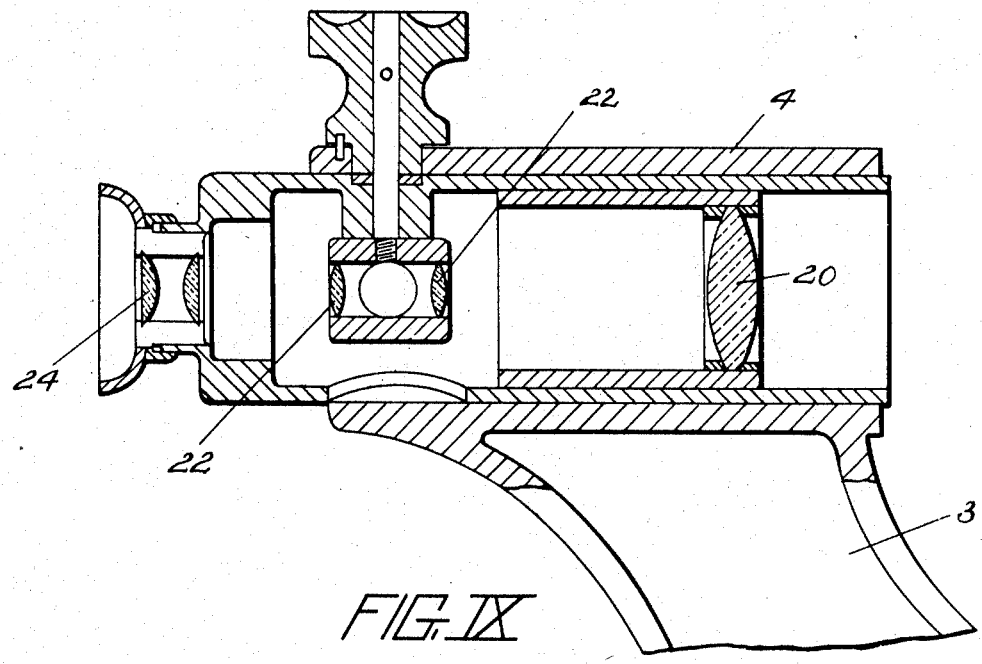
FIG. IX
INVENTOR  
*EDGAR D. TILLYER*  
BY  
*H. H. Styll & A. K. Parsons*  
ATTORNEYS Patented June 16, 1925.

1,542,112

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-TESTING INSTRUMENT.

Application filed April 10, 1922. Serial No. 551,081.

*To all whom it may concern:*

Be it known that I, EDGAR D. TILLYER, a citizen of the United States, residing at Southbridge, in the county of Worcester and State of Massachusetts, have invented certain new and useful Improvements in Lens-Testing Instruments, of which the following is a specification.

This invention relates to improvements in lens testing instruments and has particular reference to an improved instrument for accurate determination of the optical properties of lenses.

One of the principal objects of the present invention is the provision of an improved construction of lens testing instrument which may be employed to measure one or a component or plurality of lenses, and which will with absolute accuracy indicate the effective value of the lens or combination of lenses for ophthalmic purposes as respects the eye of the person making use of the same.

A further object of the present invention is the provision of an instrument of the character above set forth in which either spherical, cylindrical or sphero-cylindrical lenses may be accurately measured as respects both meridians simultaneously, and in which the final reading will show the actual power of the lens in such meridians.

A further object of the present invention is the provision of an instrument of this sort in which the lens to be tested may be mechanically viewed and positioned and optically centered or positioned without movement of the eye of the tester, and in which the lens may be accurately marked as respects either geometrical or optical center, as may be desired.

Further objects of the present invention include the provision of an instrument of this character in which the target to be viewed during the testing operation shall be of compound form and capable of ready and at the same time extremely accurate construction, and in which the image of the target will be seen in an erect or upright position.

A further object of the present invention is the provision of an improved construction of instrument in which the several parts are mechanically so related that defects or inaccuracies or variations in the optical system may be mechanically compensated for through adjustments of the instrument to the end that the readings will be at all times of extreme accuracy.

Other objects include a simplification and improvement of design and construction of the several parts, whereby most efficient and ready operation is insured, in which all adjustments necessary may be readily made with one hand of the operator, leaving the other hand free for manipulation of the lens, lenses, or mounting being tested.

Other objects and advantages of my improvement should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a perspective view of my complete instrument.

Figure II represents a longitudinal sectional view thereof.

Figure III represents a transverse sectional view as on the line III—III of Figure II.

Figure IV represents a detail view of one of the target members.

Figure V represents a similar view of the other target member.

Figure VI represents a reproduction of the image produced by the two targets when the instrument is in proper focus.

Figure VII represents an enlarged sectional view of the marking attachment.

Figure VIII represents a perspective view of the main sleeve portion of the marking attachment.

Figure IX represents a diagrammatic view illustrating the erecting system for securing most satisfactory image of the lens and mounting.

In the drawings, in which similar characters of reference are employed to denote corresponding parts throughout the several views, the numeral 1 designates the base of the instrument having rising therefrom the furcated standard 2, to which is pivoted the main arcuate shaped frame portion 3 of the instrument. This frame portion 3 has at the upper end thereof a sleeve-like or tubular portion 4, in which the eye piece portion of the optical system is located, and has at its opposite end the slide-way or table 5 on which moves the main adjustable carriage 6 bearing one of the target members and associated parts and the supplemental slide 7 bearing the second target member and the illuminating means for the target. In addition there is intermediately secured to the frame member 3 the stage or support 17 for the slidable lens table 8 having the lens clamping pins 10 for securing a member such as the lens 11 in position. This table or support is vertically slidable as in the guides 12, while the device as an entirety is also laterally slidable as in the guides 13 so that up and down and transverse movement may be made of the lens as desired to get the same properly positioned within the instrument. By this means it is possible to clamp a lens in the holder and to accurately optically center the same when the scales 14 and 15 will serve to indicate the amount of decentration of the lens from its geometrical center if any. Similarly the device as an entirety may be shifted up and down to permit of proper testing of both the distant vision and bifocal portions of a lens if desired. To aid in exact correct positioning of the lens with respect to the optical system of the instrument so that accurate back focus or effective power of the lens may be properly determined, I make use of the lens rest 9 in the form of a tube adjustably carried by the stage 17, the tube being capable of being set to exact desired position, and forming a small member centrally contacting with the lens in such manner that all lenses will occupy substantially an identical place in the instrument irrespective of the curves, this being due to the small area engaged by the supporting member.

For a most clear understanding of both the structural features and results accomplished by the present instrument, I shall first describe in detail the several mechanical structures and subsequently the general optical effects produced and the co-ordination of these parts to obtain a single result.

The stage 17 in addition to supporting the lens rest tube 9, carries what is termed the standard lens, which is in reality a compound lens composed of two or more parts, being shown in the drawings as comprising the double convex member 16 and the plano concave member 19, each held in a separate cell so that the two may be relatively adjusted to correct the lens and insure most absolute accuracy in the readings produced by the instrument, this adjustable mounting of the parts enabling the same result to be accomplished as would be the case were each lens individually figured, checked and reground, operations requiring the greatest accuracy in the production of the lens but giving no better optical effect than is here capable of attainment.

The purpose of this standard lens is to project the image of the target or targets to a distance as respects the lens to be tested, the image of the targets passing through this standard lens and the lens to be tested to the image receiving portion of the instrument which is a type of telescope device including the objective lens 20, and the conventional adjustable eye piece lens system 24. It is to be noted that an erecting lens system 22 is mounted in the rotatable carrier 24' which has sight apertures 25 and 26 extending therethrough at right angles one to the other, the sight aperture passage 25 including the erecting lens system 22. The purpose of this is that when the lens system 22 is employed the image of the lens to be tested and its supports are seen in erect or proper position, while on account of the position of the front lens 22 with respect to the objective 20 there is a very large field of view, enabling one to clearly see the outer edges and frame if mounted of the lens being tested.

Referring now to the opposite end of the instrument, as mentioned, we have the main slide 6 which is formed with a depending rack 28 meshing with the actuating pinion 29 which is carried by the sleeve member 30 rotatably journaled within the main frame 3. This sleeve bears on its outer end the dial wheel 31 provided with suitable graduations as at 32 cooperating with an indicator 33 to designate the adjustment of the instrument, said dial reading in lens powers. The wheel 31 has extending laterally therefrom the pins 34 which bear the knurled actuating wheel or hand piece 35 by which the member 31, sleeve and pinion are rotated to give the desired movement to the main carriage 6. The supplemental target bearing carriage or slide 7 may have any suitable guide member, such as the member 36, with which is associated the rack 37. It will be noted that the member 7, guide 36, and the like, are all carried by the main slide 6 and shift or move therewith. In addition, however, the main slide 6 is provided with the guide way or slotted portion 38 permitting of independent movement of the member 7 when the rack 37 is actuated as by the pinion 39. The pinion is carried by the shaft 40 partially journaled in the frame 3 and partially contained within the adjusting sleeve 30 for the main slide shifting mechanism. The shaft projects outwardly beyond the dial 31 and has mounted and secured thereon the hub 41 which bears a dial wheel portion 42 disposed immediately adjacent the dial wheel 31 and graduated as indicated at 43 to read in lens powers and is also provided with the actuating portion 44 having formed therein arcuate slots 45 through which the pins 34 project. This construction permits of relative rotation of the members 31 and 42 within the limits imposed by the slots 45 and produces the desirable feature that the actuating portion for the main slide is disposed at the extreme outer side of the instrument where it may be most readily grasped, said actuating portion 35 turning on the hub 41 and at the same time bringing the dial for the main reading at the inner side and nearest the indicator 33, while the supplemental or limited movement member is in a position where it may be readily grasped by the same hand that operates the main shifting mechanism, yet rendering both its grasping and the reading of its dial a supplemental rather than main proposition, as is proper from the manner in which the instrument is intended to be operated. To prevent accidental changing of the main reading when a supplemental movement is used, I make use of the frictional locking device as indicated at 46.

Referring to the members carried by the two slides, the main slide has rising therefrom the support 47, in which is journaled the rotatable sleeve 48 bearing an outer rotating dial 49, which may be grasped to turn said member, said dial 49 being provided with degree graduations as at 50 cooperating with the pointer 51 on the member 47 to indicate the angle or axis to which the parts have been rotated. The sleeve 48 is further provided near its forward end with the carrier or cell 52 having at the rear thereof the target member 53 and at the front the cylinder lens 54. The target 53, as will be noted by reference to Figure IV, comprises a sheet or disc of metal having a central narrow slot 55 formed therein. This slot when viewed will appear as a thin straight line and the cylinder lens is disposed with its axis parallel with this line to give a constant cylinder power to the target and thus cause a displacement of the target optically considered so that the target when viewed through the lens will present the same appearance as though it were disposed a predetermined definite distance back of the physical position it actually occupies.

Slidably mounted within the tube 48 is a second tubular member 56 keyed as at 57 to rotate with the tube 48. This member likewise bears the cell 58 carrying the target 59. This target, however, is of metal, or the like, provided with three parallel slots 60, the arrangement of the parts in the instrument being such that the slot 55 will be disposed exactly at right angles to the several slots 60, the slots being illuminated in any suitable manner, as by the lamp 61 carried by the bracket or support 7. The result of the illumination entering the instrument through the pair of targets just described is that in the absence of a lens to be tested when the two dials are set at zero position, the lens 54 will superimpose the image of the target 53 on the target 59 so that the effect will be that illustrated in Figure VI, that is to say, that three perfect clean cut squares will be seen, this being the image viewed through the instrument. These squares are produced by the intersection of the vertical and horizontal lines of light produced by the apertures in the two target members, it being understood that the complete target is viewed through the lens 54, but on account of its cylindrical value, that is to say, the lens being either a plain cylinder or a sphero cylinder, as may be desired, but having the axis of power in one meridian causing the line 55 to be seen in proper relation with respect to the lines 60 through the power of displacement of the cylinder value of the lens in the one meridian, while due to absence of a corresponding value in the opposite meridian there will be no displacement of the image of the lines 60. It is to be understood that any variation in the position of the two slides from the zero position will cause the target displaced to appear less clear or blurred on its sides as viewed through the instrument, and while the only part seen on account of the opacity of the two members will be the sides of the square, the difference between the clean cut and blurred sides of these three squares will at once indicate to the operator that there is some lack of proper focal adjustment in the instrument. The same is seen when a lens is being tested by the instrument, it being necessary to move the slides back and forth until the sides of the squares forming the target are brought out clear and sharp, when the reading of the power in the two meridians may be taken from the proper scales.

From the foregoing description the mechanical and optical structure of the instrument here under consideration should be readily understood, and it will be noted that when a lens is placed in position resting against the member 9, the light from the source of illumination 61 will pass forwardly through the slots 55 and 60 emerging in the form of three squares through the lens 54 and the lens system 16—19 to the lens being tested. Similarly the image having passed through the lens to be tested will be imaged by the objective 20, intermediate lens systems and eye piece portion so that it may be readily viewed. As the most preferred form of my invention I make use of a receiving system adapted to produce an image only of parallel emergent rays from the lens being tested; that is to say, in the absence of a lens to be tested with the targets set at the zero position, the rays emerging from the standard lens will be parallel and as such will be imaged by the telescoping eye piece portion of the instrument, while when a lens to be tested is in position the two targets must be so adjusted as to compensate for the power of the lens so that the rays from the targets after passing through the standard lens and lens being tested will in both meridians be parallel emergent rays, this being the only way in the particular instrument here under consideration in which the target may be seen with clear cut bounding lines. It is, however, to be understood that the mechanical features heretofore described could be employed with the optical system differently figured to make use of other than parallel emergent rays in the testing of the lens, and that this feature, therefore, while desirable is not essential to the mechanical utility of the present invention.

It has been previously mentioned that the lens supports are adjustable vertically and horizontally so that the lens may be exactly optically centered, a suitable reticule, or the like, being placed as at 61', to facilitate determination of the optical centering of the image through the lens. The lens having been thus optically centered it is frequently desirable to indicate the position of such optical center so that the lens may be properly cut out, mounted, and the like, in the case of uncut blanks, or checked up with the geometrical center. I secure to the frame 3 the bracket 62 bearing a sleeve 63 having a substantially V-shaped or bayonet slot 64 formed therein, in which rides the pin 65 carried by the sleeve 66 which is slidable upon the sleeve 63. This second sleeve 66 is provided with an arm 67 bearing the cross head 68 with yieldably mounted marking points 69, and is further provided with a knurled or other form of operating handle 70. A spring 71 contained within the sleeve 63 and bearing at one end against the closed end 72 of the sleeve 66 and at the other against the base of the sleeve 63 serves to press the sleeve 66 and associated parts forwardly in the direction of the lens and toward the ends of the slot. In the lower position of the marking device the pins 69 are thus pressed forward into engagement with the inking pad 73, while when desired to use the marking device the handle or actuating portion 70 is drawn slightly backward with a rotary movement, causing the pin 65 to rotate in the slot in the sleeve 63 and compressing the actuating spring. As the pin reaches the V or connecting part of the two arms of the slot and passes therebeyond further movement assisted by the spring will cause the marking device to move forward in the general direction of the lens, the final portion of the upper arm of the slot being straight so that the marking device in its final movement will shift directly ahead or straight toward the lens and the pins will mark the center and axis of the lens as held against the tube 9. Reverse drawing and turning of the sleeve 66 will then serve to turn the marking points against the ink pad and entirely out of the field of vision of the instrument.

I claim:

1. An instrument of the character described, including a standard lens, spaced independent targets disposed in different meridians and movable in and longitudinally of the optical axis of said standard lens, and a cylindrical lens attached to one of the targets for throwing a constant amount of astigmatism within the lens system of said instrument, to compensate for the minimum separation of the targets.

2. An instrument of the character described including a standard lens, spaced independent targets disposed in different meridians and movable in and longitudinally of the optical axis of said standard lens, and a cylindrical lens attached to the first target for throwing a constant amount of astigmatism within the lens system of said instrument to compensate for the minimum separation of the targets.

3. An instrument of the character described, including a standard lens, spaced independent targets disposed in different meridians and movable in and longitudinally of the optical axis of said standard lens, means for superimposing the images of the targets as viewed through the standard lens, independent means for longitudinally shifting one of said targets, and a compound dial member for indicating the relative adjustments of the targets.

4. An instrument of the character described, including a standard lens, spaced independent targets disposed in different meridians and movable in and longitudinally of the optical axis of said standard lens, means for superimposing the images of the targets as viewed through the standard lens, independent means for longitudinally shifting one of said targets, and a compound dial member for indicating the relative adjustments of the targets, said dial member comprising a split wheel and adjacent operating handles for relatively shifting the two halves of the wheel.

5. An instrument of the character described, including a standard lens, spaced independent targets disposed in different meridians and movable in and longitudinally of the optical axis of said standard lens, means for superimposing the images of the targets as viewed through the standard lens, independent means for longitudinally shifting one of said targets, and a compound dial member for indicating the relative adjustments of the targets, said dial member comprising a split wheel and adjacent operating handles for relatively shifting the two halves of the wheel, one of said operating portions operating through slots formed in the other of said members.

6. In an instrument of the character described, the combination with a frame, of a main slide carried thereby, a target carried thereby, said main slide having a depending rack portion, a sleeve journaled in the frame and bearing a pinion meshing with the rack, a supplemental slide carried by the main slide and movable with and with respect to said main slide, said supplemental slide having a rack portion depending adjacent the rack portion of the main slide, an actuating shaft for the latter rack portion journaled within the sleeve, and means for independently rotating the sleeve and the shaft to simultaneously or independently adjust the slides.

7. A target for a lens testing instrument comprising a pair of opaque discs, one of said discs having a single elongated slot formed therein, the second of said discs having a plurality of elongated slots formed therein, said discs being arranged with the slots intersecting each other at right angles.

8. In a lens testing instrument, the combination with a target member, of a second target member for use in conjunction therewith, and a lens having positive cylindrical power attached to the first target with its axis parallel to the lines of the first target whereby the image of the first target is displaced a predetermined amount, to give the effect of optically uniting the two targets when spherical lenses are being tested.

9. In a lens testing instrument, the combination with a pair of slotted opaque targets at right angles to each other, of a lens having cylindrical power attached to the first target with its axis parallel to the slot in the first target to permit the image of the slot of first target to appear in the plane of the actual slot of the other target.

10. A lens testing instrument including a support for the lens to be tested, a pair of target members disposed at one side of the support, means for separately or simultaneously adjusting the target members to compensate for the power of a lens to be tested, image receiving means at the opposite side of the lens support, said image receiving means including an objective, an eye piece and a supplemental lens system for selective positioning between the objective and eye piece.

11. A lens testing intrument of the character described including a frame having a lens support, a main target slide mounted on the frame and bearing a rotatable sleeve, a supplemental target slide mounted on the frame and bearing a rotatable sleeve telescoping with the sleeve of the first slide, means keying said sleeves together for relative longitudinal movement but against rotation, and a target member carried by each of the sleeves.

12. A lens testing instrument of the character described including a frame having a lens support, a main target slide mounted on the frame and bearing a rotatable sleeve, a supplemental target slide mounted on the frame and bearing a rotatable sleeve telescoping with the sleeve of the first slide, means keying said sleeves together for relative longitudinal movement but against rotation, a target member carried by each of the sleeves, and a protractor secured to one of the sleeves forming an operating wheel by which the sleeve may be rotated, and an indication of the amount of such rotation.

13. In an instrument of the character described, the combination with a frame, of a main and a supplemental slide mounted on the frame, each provided with a target and with a depending rack portion, a shaft journaled in the frame bearing a pinion meshing with one of said rack portions near one end, and a combined indicator and operating hand wheel on the opposite end, said wheel having arcuate slots formed therein, and a sleeve journaled in the frame and encircling a portion of the shaft, said sleeve being provided with a pinion engaging the other rack member and being exteriorly provided with an inwardly disposed dial wheel cooperating with the first mentioned dial wheel and with an outer operating handle connected with the indicating disc by pins passing through the slots in the first mentioned member whereby the parts may be independently or simultaneously adjusted.

14. In an instrument of the character described, the combination with a frame, of a main and a supplemental slide mounted on the frame, each provided with a target and with a depending rack portion, a shaft journaled in the frame bearing a pinion meshing with one of said rack portions near one end, and a combined indicator and operating hand wheel on the opposite end, said wheel having arcuate slots formed therein, a sleeve journaled in the frame and encircling a portion of the shaft, said sleeve being provided with a pinion engaging the other rack member and being exteriorly provided with an inwardly disposed dial wheel cooperating with the first mentioned dial wheel and with an outer operating handle connected with the indicating disc by pins passing through the slots in the first mentioned member whereby the parts may be independently or simultaneously adjusted, and means for locking the sleeve against accidental rotation when the shaft is being turned therewithin.

15. In a lens testing instrument, the combination with a frame, of a base secured to the frame having a guide member projecting therefrom, said guide member being formed with a cam slot and a marking device slidably and rotatably mounted upon said guide member and having a pin riding in the slot, whereby on rotative movement of said member a reciprocating movement will be imparted thereto by the cam and pin.

16. A lens marking device including a support, a sleeve rotatable and slidable on the support, one of said members being formed with a cam slot or groove, and the other of said members with a pin riding in the groove, and a marking device carried by the sleeve whereby rotation of the sleeve on its support will shift the marking device into and out of operative position.

17. A lens marking device including a support, a sleeve rotatable and slidable on the support, one of said members being formed with a cam slot or groove, and the other of said members with a pin riding in the groove, and a marking device carried by the sleeve whereby rotation of the sleeve on its support will shift the marking device into and out of operative position, said support being in the form of a tube having an interiorly contained spring engaging the sleeve for aiding in actuating the latter.

18. A lens marking device comprising a tubular support and a sleeve rotatable and slidable on the support, one of said parts having a bayonet slot type groove formed therein and the other of said members having a projection riding in the groove, a marking device carried by the sleeve, and means for shifting the sleeve on the support as guided by the pin and slot, the slot being so disposed on the support as to guide the marking device in direct linear movement toward a lens when in one position and to guide it into engagement with an inking device when reversely shifted.

19. A lens marking device comprising a tubular support and a sleeve rotatable and slidable on the support, one of said parts having a bayonet slot type groove formed therein and the other of said members having a projection riding in the groove, a marking device carried by the sleeve, and means for shifting the sleeve on the support as guided by the pin and slot, the slot being so disposed on the support as to guide the marking device in direct linear movement toward a lens when in one position and to guide it into engagement with an inking device when reversely shifted, and resilient means carried by the support and engaging the sleeve for forwardly actuating the sleeve and marking device.

20. An instrument of the character described, including a standard lens, spaced independent targets disposed in different meridians and movable in and longitudinally of the optical axis of said standard lens, means for superimposing the images of the targets as viewed through the standard lens, independent means for longitudinally shifting each of said targets, and a cylindrical lens attached to one target for adding a known constant amount of astigmatism to the lens system to prevent physical contact of the targets when they are being adjusted.

21. An instrument of the character described, including a standard lens, spaced independent targets disposed in different meridians and movable in and longitudinally of the optical axis of said standard lens, means for superimposing the images of the targets as viewed through the standard lens, independent means for longitudinally shifting each of said targets, a lens having a positive cylindrical power attached to the first target with its axis parallel to the lines of the first target whereby the image of the first target is displaced a predetermined constant amount, and a compound dial member for indicating the relative adjustments of the targets, said dial member comprising a pair of wheels side by side and adjacent operating handles for relatively shifting each of the wheels.

22. An instrument of the character described, including a standard lens, spaced independent targets disposed in different meridians and movable in and longitudinally of the optical axis of said standard lens, means for superimposing the images of the targets as viewed through the standard lens, independent means for longitudinally shifting each of said targets, a lens having a positive cylindrical power attached to the first target with its axis parallel to the lines of the first target whereby a constant amount of astigmatism is thrown into the lens system thus establishing a minimum space of separation for said targets when being adjusted so that at no time are they in physical contact.

23. In an instrument of the character described, an optical measuring system progressing from the eye to the light source, comprising a viewing eye piece, a telescope reticule in the focus of the viewing eye piece, an auxiliary lens system adapted to image the lens under test on the reticule, means to throw out of line the auxiliary lens system, a telescope objective focusing parallel light on the reticule, a positioning point for the lens to be tested, a standard adjustable lens system adapted when used in conjunction with a movable target to cause the light rays emerging from the lens under test to be parallel, an auxiliary cylindrical lens adapted to introduce a constant amount of astigmatism into the lens system, a target secured to the cylindrical lens, a second target with marking at right angles to the first target, said targets working independently of each other, and a source of light.

24. In an instrument of the character described, an optical measuring system progressing from the eye to the light source, comprising a viewing eye piece, a telescope reticule in the focus of the viewing eye piece, a telescope objective focusing parallel light on the reticule, a positioning point for the lens to be tested, a standard adjustable lens system adapted when used in conjunction with a movable target to cause the light rays emerging from the lens under test to be parallel, an auxiliary cylindrical lens adapted to introduce a constant amount of astigmatism into the lens system, a target secured to the cylindrical lens, a second target with markings at right angles to the first target, said targets working independently or simultaneously with each other, and a source of light.

EDGAR D. TILLYER.